US006843939B2

(12) United States Patent
Stretanski et al.

(10) Patent No.: US 6,843,939 B2
(45) Date of Patent: Jan. 18, 2005

(54) UV STABILIZING ADDITIVE COMPOSITION

(75) Inventors: Joseph A. Stretanski, Stamford, CT (US); Brent M. Sanders, West Lafayette, IN (US)

(73) Assignee: Cytec Technology Corp., Wilmington, DE (US)

( * ) Notice: Subject to any disclaimer, the term of this patent is extended or adjusted under 35 U.S.C. 154(b) by 100 days.

(21) Appl. No.: 10/315,584

(22) Filed: Dec. 10, 2002

(65) Prior Publication Data

US 2003/0162868 A1 Aug. 28, 2003

Related U.S. Application Data

(60) Provisional application No. 60/343,681, filed on Dec. 27, 2001.

(51) Int. Cl.$^7$ .................. C08K 5/12; C08K 5/3435; C08K 5/3462; C08K 15/08; C08K 15/30

(52) U.S. Cl. .................. 252/405; 252/407; 523/455; 523/461; 524/99; 524/100; 524/101; 524/102; 524/291; 524/560; 524/561; 524/562; 524/565; 524/567; 524/575; 524/575.5; 524/577; 524/579; 524/583; 524/585; 524/588; 524/590; 524/592; 524/594; 524/597; 524/601; 524/606; 524/609; 524/612

(58) Field of Search .................. 252/405, 407; 524/99, 102, 560, 561, 562, 565, 567, 575, 575.5, 577, 579, 583, 585, 588, 590, 592, 594, 597, 601, 606, 609, 612, 100, 101, 291; 523/455, 461

(56) References Cited

U.S. PATENT DOCUMENTS

| 3,206,431 | A | * | 9/1965 | Marshall et al. ............. 524/288 |
| 3,285,855 | A | | 11/1966 | Dexter et al. .................. 252/57 |
| 3,502,613 | A | | 3/1970 | Berger ........................ 260/45.8 |
| 3,681,431 | A | * | 8/1972 | Dexter et al. .................. 560/67 |
| 4,237,042 | A | | 12/1980 | Stretanski ............. 260/45.8 R |
| 4,670,491 | A | | 6/1987 | Stretanski et al. ........... 524/120 |
| 5,240,977 | A | | 8/1993 | Kletecka et al. ............. 524/100 |
| 5,556,973 | A | * | 9/1996 | Stevenson et al. .......... 544/216 |
| 6,348,591 | B1 | * | 2/2002 | Gupta et al. ................. 544/215 |

FOREIGN PATENT DOCUMENTS

GB    1 336 931    11/1973

OTHER PUBLICATIONS

Chemical abstracts registry No. 79720–19–7 for Sanduvor 3055 hindered amine light stabilizer, 1967.*

* cited by examiner

*Primary Examiner*—Robert Sellers
(74) *Attorney, Agent, or Firm*—James A. Jubinsky; Fran Wasserman; Claire M. Schultz

(57) ABSTRACT

This invention relates to an UV stabilizing additive composition comprising an ortho-hydroxy triazine compound, a hindered hydroxybenzoate compound and optionally a hindered amine compound. This additive composition may be used to stabilize materials from UV radiation. This invention also contemplates a method of stabilizing a material by contacting the material with the UV stabilizing additive composition.

10 Claims, No Drawings

UV STABILIZING ADDITIVE COMPOSITION

This application claims the benefit under 35 U.S.C. § 119(e) of U.S. Provisional Application Ser. No. 60/343,681, filed Dec. 27, 2001.

FIELD OF THE INVENTION

This invention relates to an improved UV stabilizing additive composition. More specifically, this invention relates to an UV stabilizing additive composition comprising an ortho-hydroxy triazine compound, a hindered hydroxybenzoate compound and optionally a hindered amine compound.

BACKGROUND OF THE INVENTION

Exposure to sunlight and other sources of ultraviolet (UV) radiation is known to cause degradation of a wide variety of materials, especially polymeric materials. For example, polymeric materials such as plastics often discolor, lose gloss and/or become brittle as a result of prolonged exposure to UV light due primarily to a reduction in the molecular weight of the polymer. Accordingly, a large body of art has been developed directed towards materials such as UV light absorbers and stabilizers, which are capable of inhibiting such degradation in polymeric articles.

U.S. Pat. No. 4,670,491 discloses the use of a $C_{12}$ to $C_{20}$ alkyl esters of 3,5-tertbutyl-4-hydroxybenzoic acid to stabilize a titanium dioxide pigmented olefin composition. U.S. Pat. No. 5,240,977 discloses the use of a 3,5-disubstituted tert-butyl-4-hydroxybenzate with a triazine based hindered amine light stabilizer (HALS) in a pigmented polyolefin composition. U.S. Pat. No. 3,206,431 discloses the use of alkyl esters of 3,5-di-tert-butyl-4-hydroxybenzoic acid as light stabilizers for polyolefins in combination with a hindered phenol antioxidant. U.S. Pat. Nos. 3,681,431 and 3,285,855 disclose the use of n-octadecyl 3,5-di-tert-butyl-4-hydroxybenzoate as an antioxidant for polyolefins. British Pat. No. 1,336,931 teaches the use of aryl esters of 3,5-di-tert-butyl-4-hydroxybenzoic acid as light stabilizers for polyolefins in combination with a benzophenone and a peroxide decomposer. U.S. Pat. No. 3,502,613 teaches a synergistic combination of an aryl ester of 3,5-di-tert-butyl-4-hydroxybenzoic acid, a chlorobenzotriazole, a phenolic antioxidant, and a thiodipropionate ester as a light stabilizer for polypropylene. U.S. Pat. No. 4,237,042 discloses a light stabilizer composition for polyolefins comprising n-hexadecyl 3,5-di-tert-butyl-4-hydroxybenzoate and a dialkyl pentaerythrityl diphosphite.

None of the above documents disclose the use of a hindered hydroxybenzoate compound with an ortho-hydroxy triazine UV absorber either with or without a hindered amine compound.

SUMMARY OF THE INVENTION

This invention relates to an UV stabilizing additive composition comprising an ortho-hydroxy triazine compound, a hindered hydroxybenzoate compound and optionally a hindered amine compound. This additive composition may be used to stabilize materials from UV radiation. This invention also contemplates a method of stabilizing a material by contacting the material with the UV stabilizing additive composition.

DETAILED DESCRIPTION OF THE INVENTION

This invention relates to an UV stabilizing additive composition comprising an ortho-hydroxy tris-aryl-s-triazine compound; and a hindered hydroxybenzoate compound, and optionally a hindered amine light stabilizing (HALS) compound containing, for example a 2,2,6,6-tetraalkylpiperdine or 2,2,6,6-tetraalkylpiperazinone radical.

Preferably, the ortho-hydroxy tris-aryl-s-triazine compound has the following formula I:

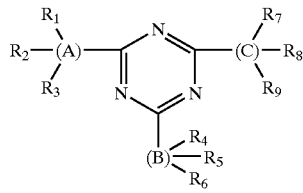

where A, B and C are each aromatic, at least one of A, B and C is substituted by a hydroxy group ortho to the point of attachment to the triazine ring, and each of $R_1$ through $R_9$ is selected from the group consisting of hydrogen, hydroxy, alkyl, alkoxy, sulfonic, carboxy, halo, haloalkyl and acylamino having from about 1 to about 24 carbon atoms.

One embodiment of the tris-aryl-s-triazine is a compound having the formula II:

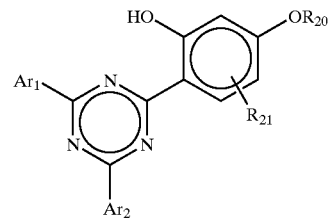

where $Ar_1$ and $Ar_2$ are the same or different and are substituted or unsubstituted aryl groups; and where $R_{20}$ and $R_{21}$ are each independently a hydrogen, $C_1$–$C_{24}$ alkyl, $C_1$–$C_{24}$ haloalkyl, $C_6$–$C_{24}$ aryl, $C_2$–$C_{24}$ alkenyl, $C_1$–$C_{24}$ acyl, $C_1$–$C_{24}$ cycloalkyl, $C_5$–$C_{24}$ cycloacyl, $C_7$–$C_{24}$ aralkyl, or $C_6$–$C_{24}$ aracyl, substituted or unsubstituted biphenylene, substituted or unsubstituted napthalene, OR, NRR', CONRR', OCOR, CN, SR, $SO_2R$, and where R and R' are each independently a hydrogen, $C_1$–$C_{24}$ alkyl, $C_1$–$C_{24}$ haloalkyl, $C_6$–$C_{24}$ aryl, $C_2$–$C_{24}$ alkenyl, $C_1$–$C_{24}$ acyl, $C_1$–$C_{24}$ cycloalkyl, $C_5$–$C_{24}$ cycloacyl, $C_7$–$C_{24}$ aralkyl, or $C_6$–$C_{24}$ aracyl, substituted or unsubstituted biphenylene, or substituted or unsubstituted napthalene.

Preferably, in the above formula II, $Ar_1$ has the formula IIa:

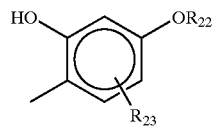

where $R_{22}$ and $R_{23}$ are each independently a hydrogen, $C_1$–$C_{24}$ alkyl, $C_1$–$C_{24}$ haloalkyl, $C_6$–$C_{24}$ aryl, $C_2$–$C_{24}$ alkenyl, $C_1$–$C_{24}$ acyl, $C_1$–$C_{24}$ cycloalkyl, $C_5$–$C_{24}$ cycloacyl, $C_7$–$C_{24}$ aralkyl, or $C_6$–$C_{24}$ aracyl, substituted or unsubstituted biphenylene, substituted or unsubstituted napthalene, OR, NRR', CONRR', OCOR, CN, SR, and $SO_2R$, and where R and R' are as defined above.

Also preferred in the above formula II is when $R_{20}$ is hydrogen or a $C_1$–$C_8$ alkyl, $R_{21}$ is hydrogen and $Ar_1$ and $Ar_2$ maybe the same or different and are benzyl, methylbenzyl, or dimethylbenzyl.

Examples of suitable tris-aryl-s-triazine that may be used are 2,4,6-tris(2-hydroxy-4-octyloxyphenyl)-1,3,5-triazine; 2-(2-hydroxy-4-n-octyloxyphenyl)-4,6-bis(2,4-dimethylphenyl)-1,3,5-triazine; 2-(2-hydroxy-4-(mixed iso-octyloxyphenyl)-4,6-bis(2,4-dimethylphenyl)-1,3,5-triazine; 2-(2,4-dihydroxyphenyl)-4,6-bis(2,4-dimethylphenyl)-1,3,5-triazine; 2,4-bis(2-hydroxy-4-propyloxyphenyl)-6-(2,4-dimethylphenyl)-1,3,5-triazine; 2-(2-hydroxy-4-octyloxyphenyl)-4,6-bis(4-methylphenyl)-1,3,5-triazine; 2-(2-hydroxy-4-dodecyloxyphenyl)-4,6-bis(2,4-dimethylphenyl)-1,3,5-triazine; 2-(2-hydroxy-4-tridecyloxyphenyl)-4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyl oxy)-phenyl]-4,6-bis(2,4-dimethylphenyl)-1,3,5-triazine; 2-[4-dodecyloxy/tridecyloxy-2-hydroxypropoxy)-2-hydroxyphenyl]-4,6-bis(2,4-dimethylphenyl)-1,3,5-triazine; 2-[2-hydroxy-4-(2-hydroxy-3-dodecyloxypropoxy)phenyl]-4,6-bis(2,4-dimethylphenyl)-1,3,5-triazine; 2-(2-hydroxy-4-hexyloxy)phenyl-4,6-diphenyl-1,3,5-triazine; 2-(2-hydroxy-4-methoxyphenyl)-4,6-diphenyl-1,3,5-triazine; 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

The optional hindered amine compound may be any suitable hindered amine compound such as those containing a 2,2,6,6-tetraalkylpiperdine or 2,2,6,6-tetraalkylpiperazinone radical. One embodiment of a hindered amine compound is one that contains at least one group having the following formula III:

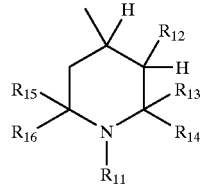

where $R_{11}$ is hydrogen, O, OH, $C_1$–$C_{18}$ alkyl, —$CH_2CN$, $C_1$–$C_{18}$ alkoxy, $C_1$–$C_{18}$ hydroxyalkoxy, $C_5$–$C_{12}$ cycloalkoxy, $C_5$–$C_{12}$ hydrocycloalkoxy, $C_3$–$C_6$ alkenyl, $C_1$–$C_{18}$ alkynyl, $C_7$–$C_9$ phenylalkyl, unsubstituted or substituted on the phenyl with 1, 2 or 3 $C_1$–$C_4$ alkyls, or an aliphatic $C_1$–$C_8$ acyl; $R_{12}$ is hydrogen, $C_1$–$C_8$ alkyl, or benzyl; $R_{13}$, $R_{14}$, $R_{15}$, and $R_{16}$ are each independently a $C_1$–$C_{18}$ alkyl, benzyl or phenethyl, or optionally $R_{13}$ and $R_{14}$, and/or $R_{15}$ and $R_{16}$, taken together with the carbon which they are attached, form a $C_5$–$C_{10}$ cycloalkyl.

Another embodiment of a hindered amine compound is a compound that has formula IV below:

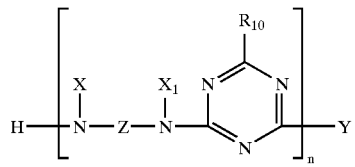

where $R_{10}$ is a morpholino, $C_1$–$C_8$ alkylamine, di($C_1$–$C_8$) alkylamine, pyrrolidyl, cyclohexylamine or combinations thereof, X and $X_1$, which may be the same or different, and are hydrogen, $C_1$–$C_{20}$ alkyl, or a radical of formula III defined above, $R_{11}$ to $R_{16}$ are as defined above, Z is a straight chained or branched $C_1$–$C_{20}$ alkylene or a straight chained or branched $C_1$–$C_{20}$ alkalene chain interrupted by at least oxy, thio, or —N($R_{17}$)—, where $R_{17}$ is hydrogen, $C_1$–$C_{20}$ alkyl, $C_5$–$C_{10}$ cycloalkylene $C_6$–$C_{12}$ arylene, $C_8$–$C_{14}$ aralkylene or the radical of formula III;

n is an integer greater than 1;

and Y is a halogen atom, $C_1$–$C_8$ alkylamine, di($C_1$–$C_8$) alkylamine, pyrrolidyl, morpholino, cyclohexylamine, or

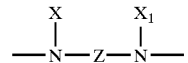

where X, $X_1$, and Z are as previously defined.

Preferably in the above formula IV, Z is a $C_2$ to $C_6$ alkylene, $R_{10}$ is a morpholino or cyclohexylamine, X and $X_1$ is the radical of formula III, $R_{11}$ is hydrogen or methyl, $R_{12}$ is hydrogen, and $R_{13}$, $R_{14}$, $R_{15}$ and $R_{16}$ are methyl.

Another embodiment of a hindered amine is a 2,2,6,6-tetraalkylpiperazinone. One embodiment of a 2,2,6,6-tetraalkylpiperazinone compound is one that contains at least one group of formula IVa:

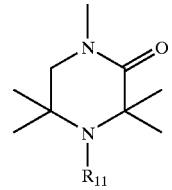

where $R_{11}$ is as defined above.

Examples of suitable hindered amine compounds include, but are not limited to: 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)methylene]-bis-(1,2,2,6,6-pentamethyl-4-piperidinyl)ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl)nitrilotriacetate; 1,5- dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl) hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl)n-butyl 3,5-di-tert-butyl-4-hydroxybenzylmalonate; tris(2,2,6,6-tetramethylpiperidin-4-yl)nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl) succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl).

It is also contemplated in this application that the hindered amine compound is not optional and the UV stabilizing additive composition would contain an ortho-hydroxy triazine compound, a hindered hydroxybenzoate compound and a hindered amine compound.

The hindered hydroxybenzoate compound of the present invention may be any suitable hindered hydroxybenzoate compound such as those having the formula V:

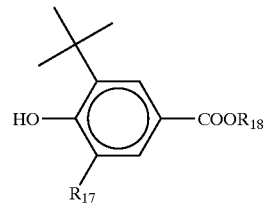

where $R_{17}$ is a $C_1$–$C_8$ alkyl and $R_{18}$ is a $C_1$–$C_{24}$ alkyl, or substituted or unsubstituted $C_6$–$C_{24}$ aryl. Preferably, $R_{17}$ is t-butyl and $R_{18}$ is a $C_{10}$–$C_{20}$ alkyl.

Examples of suitable hindered hydroxybenzoate compounds include: 2,4-di-tert-butylphenyl 3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; tetradecyl-3,5-di-tert-butyl-4-hydroxybenzoate; behenylyl-3,5-di-tert-butyl-4-hydroxybenzoate; 2-methyl-4,6-di-tert-butylphenyl 3,5-di-tert-butyl-4-hydroxybenzoate and butyl 3-[3-t-butyl-4-(3,5-di-t-butyl-4-hydroxybenzoyloxy)phenyl]propionate.

In one embodiment of the present invention, the UV stabilizing additive composition of the present invention may be employed to stabilize materials which are subject to degradation by ultraviolet radiation by contacting the UV stabilizing additive composition with a composition comprising polymeric or other materials, either chemically or physically. Non-limiting examples of materials that may be so stabilized are polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxide, polysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, fibers, waxes, inks, and blends thereof.

Preferably, the materials to be stabilized are thermoplastic olefins, acrylonitrile-butadiene-styrene, polyesters, polyvinylchloride, polyamides, polyurethanes, or homo- and copolymers of propylene, isobutylene, butene, methylpentene, hexene, heptene, octene, isoprene, butadiene, hexadiene, dicyclopentadiene, ethylidene cyclopentene and norbornene. More preferably, the materials are polypropylene and thermoplastic olefins.

The amount of the triazine compound used in the material to be stabilized is about 0.001 to about 3.0 wt %, preferably about 0.01 to about 1.0 wt % and more preferably 0.1 to about 0.5 wt % based on the total weight of the material to be stabilized.

The amount of the hindered hydroxybenzoate compound is the material to be stabilized about 0.001 to about 3.0 wt %, preferably about 0.01 to about 2.0 wt %, more preferably about 0.1 to about 1.0 wt % based on the total weight of the material to be stabilized.

The amount of the hindered amine compound in the material to be stabilized is about 0.001 to about 3.0 wt %, preferably about 0.01 to about 2.0 wt %, more preferably about 0.1 to about 1.0 wt % based on the total weight of the material to be stabilized.

This application also contemplates a method of preparing the compositions above by contacting the UV stabilizing additive composition with the material to be stabilized. The material to be stabilized and UV stabilizing additive composition are contacted by preferably blending or compounding the components in a kneading apparatus such as a single or twin screw extruder, Banbury mixer, or hot rollers. The processing parameters and the use of such kneading apparatuses are well known to those skilled in the art.

As would be apparent to those skilled in the art of making plastic materials, in addition to the material to be stabilized and UV stabilizing additive composition, the composition of the present invention may include conventional additives including but are not limited to, antioxidants, metal deactivators, hydroxylamines, nitrones, lactones, co-stabilizers, nucleating agents, clarifying agents, neutralizers, metallic stearates, metal oxides, hydrotalcites, fillers and reinforcing agents, plasticizers, lubricants, emulsifiers, pigments, rheological additives, catalysts, level agents, optical brighteners, flame retardant agents, anti-static agents and blowing agents.

The present invention will now be illustrated by the following examples. The examples are not intended to limit the scope of the present invention. In conjunction with the general and detailed descriptions above, the examples provide further understanding of the present invention.

EXAMPLES

Examples 1 to 3

Gloss Retention, Delta E, Delta YI and Breaking Strength in a Polypropylene Homopolymer Composition The UV additives of Examples 1 to 3 were mixed by using a dry blending technique. In addition to the additives, an antioxidant package containing 0.05% by weight Cyanox® 1741 (1,3,5-tris-(3,5-di-tert-butyl-4-hydroxybenzyl)-s-triazine-2,4,6(1H,3H,5H)trione) from Cytec Industries Inc, 0.05% by weight Doverphos® 9228 (bis(2,4-dicumylphenyl) pentaerythritol diphosphite) from Dover Chemical Corporation and 0.05% by weight calcium stearate were also mixed with the UV additives. These additives were compounded with a polypropylene homopolymer from Basell (PH350) and extruded using conventional single-screw extrusion parameters. After extrusion, standard 2×2× 0.125 inch plaques were injection molded using an Arburg injection molder.

The performance criteria of Gloss retention, Delta E, Delta YI and Breaking Strength were measured at set exposure intervals (2000 and 3125 hours) using accelerated exposure in a xenon weather-ometer under ASTM-G-155 testing conditions. Prior to gloss and color measurements, the samples were washed with DI water and wiped.

Gloss retention was conducted under ASTM Test Procedure D523 with a 60° angle.

Yellow Index (YI) and Delta E data was obtained using a Macbeth Color Eye Colorimeter using ASTM D2244-79 with 1″ view and D65/10° observer. Delta YI and Delta E is the difference between samples measured before and after the weather-ometer testing. Lower Delta E and Delta YI means less color and less yellow index change respectively indicating better performance.

For breaking strength, 3 tensile bars per each data point were tested on an Instron Engineering Company Tensile Tester (Model TTB). The average tensile breaking strength of the three test samples were measured and normalized to samples that were not UV exposed to give a % breaking strength. The cross-head speed of the tensile tester was 1 inch (0.254 cm.) per minute.

The results are shown in Tables 1 to 4 below.

TABLE 1

Percent Gloss Retention of Examples 1 to 3

| Example | Description | % gloss retention 2000 hours | % gloss retention 3150 hours |
|---|---|---|---|
| 1 | 0.32% UV 2908 | 60 | 18 |
| 2 | 0.04% UV 1164/0.28% UV 2908 | 95 | 62 |
| 3 | 0.15% UV 2908/0.128% UV 3529/ 0.022% UV 1164 (0.3% total) | 99 | 99 |

Cyasorb ® UV 2908 is 3,5-di-tert-butyl-4-hydroxybenzoic acid, hexadecyl ester (hindered hydroxybenzoate)
Cyasorb ® UV 3529 is 1,6-hexanediamine, N,N'-bis(1,2,2,6,6-pentamethyl-4-piperidinyl)-, Polymers with morpholine-2,4,6-trichloro-1,3,5-triazine (HALS)
Cyasorb ® UV 1164 is 2-[4,6-bis(2,4-dimethylphenyl)-1,3,5-triazin-2-yl]-5-(octyloxy) phenol (triazine UV absorber)

TABLE 2

Delta E of Examples 1 to 3

| Example | Description | Delta E 2000 hours | Delta E 3150 hours |
|---|---|---|---|
| 1 | 0.32% UV 2908 | 0.2 | 5.4 |
| 2 | 0.04% UV 1164/0.28% UV 2908 | 1.2 | 1.5 |
| 3 | 0.15% UV 2908/0.128% UV 3529/ 0.022% UV 1164 (0.3% total) | 0.8 | 0.8 |

TABLE 3

Delta YI of Examples 1 to 3

| Example | Description | Delta YI 2000 hours | Delta YI 3150 hours |
|---|---|---|---|
| 1 | 0.32% UV 2908 | 1.6 | 2.7 |
| 2 | 0.04% UV 1164/0.28% UV 2908 | 0.5 | 1.8 |
| 3 | 0.15% UV 2908/0.128% UV 3529/ 0.022% UV 1164 (0.3% total) | 0.4 | 0.25 |

TABLE 4

Normalized Breaking Strength of Examples 1 to 3

| Example | Description | % Breaking Strength 2000 hours | % Breaking Strength 3150 hours |
|---|---|---|---|
| 1 | 0.32% UV 2908 | 114% | 15% |
| 2 | 0.04% UV 1164/0.28% UV 2908 | 98% | 97% |
| 3 | 0.15% UV 2908/0.128% UV 3529/0.022% UV 1164 (0.3% total) | 95% | 89% |

The results demonstrate that additive compositions containing a triazine UV absorber with the hindered hydroxybenzoate perform better than compositions containing the hindered hydroxybenzoate alone.

Examples 4 to 8

Gloss Retention and Delta E in a Pigmented TPO Composition

The UV additives of Examples 4 to 8 were mixed by using a dry blending technique. In addition to the additives, an antioxidant package containing 0.05% by weight Cyanox® 1741 (1,3,5-tris-(3,5-di-tert-butyl-4-hydroxybenzyl)-s-triazine-2,4,6(1H,3H,5H)trione) from Cytec Industries Inc, 0.05% by weight Doverphos® 9228 (bis(2,4-dicumylphenyl)pentaerythritol diphosphite) from Dover Chemical Corporation and 0.05% by weight calcium stearate were also mixed with the UV additives. These additives were compounded with reactor grade TPO polymer from Equistar (MF 1.3, Flex Modulus 25,200 psi) and a gray pigment using a 4% let down ratio via conventional single-screw extrusion parameters. After extrusion, standard 2×2× 0.125 inch plaques were injection molded using an Arburg injection molder. The total amount of UV stabilizer package for each sample was approximately 0.2 wt %, based on the total weight of the sample.

The performance criteria of gloss retention were measured at set exposure intervals (2500, 3750 and 5000 kj) using accelerated exposure in a xenon weather-ometer under SAEJ1885 interior automotive testing conditions. Prior to gloss measurement, the samples were washed with DI water and wiped. The results are shown in table 5 below: (The 2500 kj interval samples were not washed and wiped and thus were not included in the results).

TABLE 5

Percent Gloss Retention of Examples 4 to 8

| Example | Description | % gloss retention 3750 kj | % gloss retention 5000 kj |
|---|---|---|---|
| 4 | 0.2% UV 2908 | 5 | Surface cracks |
| 5 | 0.2% UV 3529 | 51 | 30 |
| 6 | 0.1% UV 1164/0.1% UV 3529 | 54 | 39 |
| 7 | 0.1% UV 3529/0.1% UV 2908 | 87 | 50 |
| 8 | 0.1% UV 2908/0.085% UV 3529/ 0.015% UV 1164 | 86 | 77 |

The results in Table 5 demonstrate that a TPO composition containing a hindered hydroxybenzoate, hindered amine and triazine UV absorber, (Example 8), provides better gloss retention than the individual components or combination of components.

Color change, (Delta E), were also measured for Examples 4 to 8 and are shown below in Table 6. Delta E measurements were obtained using the same procedure in Examples 1 to 3 above.

TABLE 6

Delta E of Examples 4 to 8

| Example | Description | Delta E 3750 kj | Delta E 5000 kj |
|---|---|---|---|
| 4 | 0.2% UV 2908 | 2.6 | Surface cracks |
| 5 | 0.2% UV 3529 | 1.3 | 1.1 |
| 6 | 0.1% UV 1164/0.1% UV 3529 | 1 | 1.9 |
| 7 | 0.1% UV 3529/0.1% UV 2908 | 0.6 | 1.5 |
| 8 | 0.1% UV 2908/0.085% UV 3529/ 0.015% UV 1164 | 1.0 | 1.9 |

The results show that the hindered hydroxybenzoate/HALS composition (Example 7) had comparable Delta E performance to the composition containing a hindered hydroxybenzoate, hindered amine and triazine UV absorber (Example 8). It was speculated that the pigment in Example 7 was blocking or absorbing some of the UV radiation. This theory was tested in Examples 9 to 11 discussed below.

Examples 9 to 11

Percent Gloss Retention and Delta E Change in a Non-pigmented TPO System

Examples 7 and 8 were tested in a non-pigmented system along with a 0.2 wt % composition of Tinuvin® 791. Tinuvin 791 is an UV additive package used in the TPO industry. The samples were prepared similar to Examples 4 to 8 except that a pigment was not used in the samples and Tinuvin 791 had its own proprietary anti-oxidant package. The results for gloss retention and Delta E are shown in Tables 7 and 8 below.

TABLE 7

Percent Gloss Retention of Examples 9 to 11

| Example | Description | % gloss retention 2500 kj | % gloss retention 3750 kj | % gloss retention 5000 kj |
|---|---|---|---|---|
| 9 | 0.2% Tinuvin 791 | 89 | Surface cracks | Surface cracks |

TABLE 7-continued

Percent Gloss Retention of Examples 9 to 11

| Example | Description | % gloss retention 2500 kj | % gloss retention 3750 kj | % gloss retention 5000 kj |
|---|---|---|---|---|
| 10 | 0.1% UV 3529/0.1% UV 2908 | 92 | Surface cracks | Surface cracks |
| 11 | 0.1% UV 2908/0.085% UV 3529/0.015% UV 1164 | 96 | 88 | 85 |

TABLE 8

Delta E of Examples 9 to 11

| Example | Description | Delta E 2500 kj | Delta E 3750 kj | Delta E 5000 kj |
|---|---|---|---|---|
| 9 | 0.2% Tinuvin 791 | 0.6 | Surface cracks | Surface cracks |
| 10 | 0.1% UV 3529/0.1% UV 2908 | 0.6 | Surface cracks | Surface cracks |
| 11 | 0.1% UV 2908/0.085% UV 3529/0.015% UV 1164 | 0.3 | 0.9 | 0.7 |

Tinuvin ® 791 is a 1:1 blend of Tinuvin ® 770 and Chimassorb ® 944.
Chimassorb ® 944 is poly [6-[(1,1,3,3-tetramethyl butyl) amino]-s-triazine-2,4-diyl][[(2,2,6,6-tetramethyl-4-piperidyl) imino] hexamethylene [(2,2,6,6,-tetramethyl-4-piperidyl) imino]].
Tinuvin 770 ® is bis(2,2,6,6-tetramethyl-4-piperidinyl) sebacate.
Tinuvin ® and Chimassorb ® are trademarks of Ciba Specialty Chemicals, Corp.

The results in Tables 7 and 8 demonstrate the superior performance of the composition containing the hindered hydroxybenzoate, hindered amine and triazine UV absorber in a non-pigmented TPO system.

Example 12

Comparison of UV Absorbers

A composition containing a benzotriazole UV absorber (Tinuvin® 328), a HALS Chimassorb® 119) and a hindered hydroxybenzoate is compared to Example 8 with respect to gloss retention and Delta E. Example 12 was prepared according to the procedure of Examples 4 to 8 above except it had its own proprietary anti-oxidant package.

TABLE 9

Percent Gloss Retention of Examples 8 and 12

| Example | Description | % gloss retention 3750 kj | % gloss retention 5000 kj |
|---|---|---|---|
| 8 | 0.1% UV 2908/0.085% UV 3529/0.015% UV 1164 | 86 | 77 |
| 12 | 0.1% UV 2908/0.085% Chimmasorb 119/0.015% Tinuvin 328 | 59 | Surface cracks |

TABLE 10

Delta E of Examples 8 and 12

| Example | Description | Delta E 3750 kj | Delta E 5000 kj |
|---|---|---|---|
| 8 | 0.1% UV 2908/0.085% UV 3529/0.015% UV 1164 | 1.0 | 1.9 |
| 12 | 0.1% UV 2908/0.085% Chimmasorb 119/0.015% Tinuvin 328 | 2.5 | Surface cracks |

Tinuvin ® 328 is 2-(2H-benzotriazol-2-yl)-4,6-bis(1,1-dimethylpropyl) phenol.
Chimassorb ® 119 is 1,3,5-triazine-2,4,6-triamine, N,N'''-[1,2-ethanediylbis [[[4,6-bis[butyl(1,2,2,6,6-pentamethyl-4-piperdinyl)amino]-1,3,5-triazine-2-yl]imino]-3,1-propanediyl]]-bis[N',N''-dibutyl-N',N''-bis(1,2,2,6,6-pentamethyl-4-piperidinyl)].

The results show that the composition containing the triazine UV absorber was superior over the composition containing the benzotriazole UV absorber.

Examples 13 to 19

Comparison to Commercial TPO UV Stabilizers

The following Examples illustrate that a TPO composition containing a hindered hydroxybenzoate, hindered amine and triazine UV absorber performs better than commercial TPO additives. The procedure of Examples 4 to 8 was used to make the following examples with the exception that the TPO was produced by Basell (Grade AH 387 Bumper grade resin), the samples contained 5% talc and were washed with DI water and wiped prior to measurement at all intervals. Examples 17 to 19 had their own proprietary anti-oxidant package. The composition percentages are approximations.

TABLE 11

Percent Gloss Retention of Examples 13 to 19

| Example | Description | % gloss retention 2000 kj | % gloss retention 3000 kj | % gloss retention 4000 kj |
|---|---|---|---|---|
| 13 | 0.1% UV 2908/0.085% UV3529/0.015% UV 1164 (0.2% total) | 91 | 83 | 71 |
| 14 | 0.15% UV 2908/0.128% UV3529/0.022% UV 1164 (0.3% total) | 92 | 85 | 74 |
| 15 | 0.067% UV 2908/0.116 UV3529/0.017% UV 1164 (0.2% total) | 91 | 82 | 72 |
| 16 | 0.1% UV2908/0.175 UV3529/0.025% UV 1164 (0.3% total) | 92 | 86 | 74 |
| 17 | 0.3%Tinuvin 791 | 74 | 62 | 50 |
| 18 | 0.3% Tinuvin 783 | 85 | 59 | Surface cracks |
| 19 | 0.15% Tinuvin 123/0.15% Tinuvin 119 | 82 | 57 | 23 |

TABLE 12

Delta E of Examples 13 to 19

| Example | Description | Delta E 2000 kj | Delta E 3000 kj | Delta E 4000 kj |
|---|---|---|---|---|
| 13 | 0.1% UV2908/0.085% UV3529/0.015% UV 1164 (0.2% total) | 0.6 | 0.7 | 1.2 |
| 14 | 0.15% UV2908/0.128% UV3529/0.022% UV 1164 (0.3% total) | 0.7 | 0.9 | 1.1 |

TABLE 12-continued

Delta E of Examples 13 to 19

| Example | Description | Delta E 2000 kj | Delta E 3000 kj | Delta E 4000 kj |
|---|---|---|---|---|
| 15 | 0.067% UV 2908/0.116 UV3529/ 0.017% UV 1164 (0.2% total) | 0.6 | 0.7 | 1.0 |
| 16 | 0.1% UV2908/0.175 UV3529/ 0.025% UV 1164 (0.3% total) | 0.6 | 0.7 | 1.0 |
| 17 | 0.3% Tinuvin 791 | 1.0 | 1.1 | 1.5 |
| 18 | 0.3% Tinuvin 783 | 0.9 | 1.4 | Surface cracks |
| 19 | 0.15% Tinuvin 123/0.15% Chimassorb 119 | 0.9 | 1.2 | 1.6 |

Tinuvin ® 783 is a 1:1 blend of Tinuvin ® 622 and Chimassorb 944
Tinuvin ® 622 is a dimethyl succinate polymer with 4-hydroxy-2,2,6,6-tetramethyl-1-piperidineethanol
Tinuvin ® 123 is bis-(1-octyloxy-2,2,6,6,tetramethyl-4-piperidinyl) sebacate The results demonstrate that the compositions containing the hindered benzoate, hindered amine and triazine UV absorber in Examples 13 to 16 perform better than compositions containing commercial TPO additives.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A composition comprising an UV stabilizing composition comprising:

(i) an ortho-hydroxy tris-aryl-s-triazine compound;
(ii) a hindered hydroxybenzoate compound; and
(iii) a hindered amine compound containing a 2,2,6,6-tetraalkylpiperidine or 2,2,6,6-tetraalkylpiperazinone radical.

2. The composition of claim 1 wherein said tris-aryl triazine has the formula I:

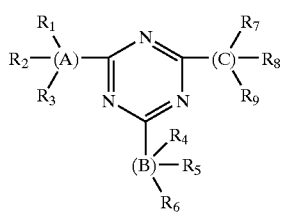

wherein A, B and C are each aromatic, at least one of A, B and C is substituted by a hydroxy group ortho of the point of attachment to the triazine ring, and each of $R_1$ through $R_9$ is selected from the group consisting of hydrogen, hydroxy, alkyl, alkoxy, sulfonic, carboxy, halo, haloalkyl and acylamino;

wherein said hindered hydroxybenzoate compound has the formula V:

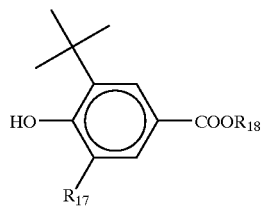

wherein $R_{17}$ is a $C_1$–$C_8$ alkyl and $R_{18}$ is a $C_1$–$C_{24}$ alkyl, or substituted or unsubstituted $C_6$–$C_{24}$ aryl; and
wherein said hindered amine compound contains a radical having the formula III:

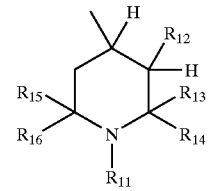

wherein $R_{11}$ is hydrogen, O, OH, $C_1$–$C_{18}$ alkyl, —$CH_2CN$, $C_1$–$C_{18}$ alkoxy, $C_1$–$C_{18}$ hydroxyalkoxy, $C_5$–$C_{12}$ cycloalkoxy, $C_5$–$C_{12}$ hydrocycloalkoxy, $C_3$–$C_8$ alkenyl, $C_1$–$C_{18}$ alkynyl, $C_7$–$C_9$ phenylalkyl, unsubstituted or substituted on the phenyl with 1, 2 or 3 $C_1$–$C_4$ alkyls, or an aliphatic $C_1$–$C_8$ acyl; $R_{12}$ is hydrogen, $C_1$–$C_8$ alkyl, or benzyl; $R_{13}$, $R_{14}$, $R_{15}$, and $R_{16}$ are each independently a $C_1$–$C_{18}$ alkyl, benzyl or phenethyl, or optionally $R_{13}$ and $R_{14}$, and/or $R_{15}$ and $R_{16}$, taken together with the carbon which they are attached, form a $C_5$–$C_{10}$ cycloalkyl.

3. The composition of claim 1, wherein said triazine is selected from the group consisting of: 2,4,6-tris(2-hydroxy-4-octyloxyphenyl)-1,3,5-triazine; 2-(2-hydroxy-4-n-octyloxyphenyl)-4,6-bis(2,4-dimethylphenyl)-1,3,5-triazine; 2-(2-hydroxy-4-(mixed iso-octyloxyphenyl)-4,6-bis(2,4-dimethylphenyl)-1,3,5-triazine; 2-(2,4-dihydroxyphenyl)-4,6-bis(2,4-dimethylphenyl)-1,3,5-triazine; 2,4-bis(2-hydroxy-4-propyloxyphenyl)-6-(2,4-dimethylphenyl)-1,3,5-triazine; 2-(2-hydroxy-4-octyloxyphenyl)4,6-bis(4-methylphenyl)-1,3,5-triazine; 2-(2-hydroxy-4-dodecyloxyphenyl)-4,6-bis(2,4-dimethylphenyl)-1,3,5-triazine; 2-(2-hydroxy-4-tridecyloxyphenyl)-4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)-phenyl]-4,6-bis(2,4-dimethylphenyl)-1,3,5-triazine; 2-[4-dodecyloxy/tridecyloxy-2-hydroxypropoxy)-2-hydroxyphenyl]-4,6-bis(2,4-dimethylphenyl)-1,3,5-triazine; 2-[2-hydroxy-4-(2-hydroxy-3-dodecyloxypropoxy)phenyl]-4,6-bis(2,4-dimethylphenyl)-1,3,5-triazine; 2-(2-hydroxy-4-hexyloxy)phenyl-4,6-diphenyl-1,3,5-triazine; 2-(2-hydroxy-4-methoxyphenyl)-4,6-diphenyl-1,3,5-triazine; 2,4,6-tris[2-hydroxy4-(3-butoxy-2-hydroxypropoxy)phenyl]-1,3,5-triazine and 2-(2-hydroxyphenyl)-4-(4-methoxyphenyl)-6-phenyl-1,3,5-triazine.

4. The composition of claim 1, wherein said hindered hydroxybenzoate compound is selected from the group consisting of: 2,4-di-tert-butylphenyl 3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; tetradecyl-3,5-di-tert-butyl-4-hydroxybenzoate; behenylyl-3,5-di-tert-butyl-4- hydroxybenzoate; 2-methyl-4,6-di-tert-butylphenyl 3,5-di-tert-butyl-4-hydroxybenzoate and butyl 3-[3-t-butyl-4-(3,5-di-t-butyl-4-hydroxybenzoyloxy)phenyl]propionate.

5. The composition of claim 1, wherein said hindered amine compound is selected from the group consisting of: 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-]; piperazinone, 1,1',1"-[1,3,5-triazine-2,4,6-triyltris[(cyclohexylimino)-2,1-ethanediyl]]tris[3,3,4,5,5-pentamethyl-]; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl) hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl) hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl) butylamino-1,3,5-triazine; propanedioic acid, [(4-methoxyphenyl)-methylene]-bis-(1,2,2,6,6-pentamethyl-4-piperidinyl)ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; bis(2,2,6,6-tetramethylpiperidin-4-yl)nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl) hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl); 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl)n-butyl 3,5-di-tert-butyl-4-hydroxybenzylmalonate; tris(2,2,6,6-tetramethylpiperidin-4-yl)nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl) succinate; 8-acetyl-3-dodecyl-7,7,9,9-tetramethyl-1,3,8-trazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4--piperidinyl).

6. The composition of claim 1, further comprising a material to be stabilized selected from the group consisting of: polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, fibers, waxes, inks, and blends thereof.

7. The composition of claim 6, wherein said material to be stabilized is selected from the group consisting of thermoplastic olefins, acrylonitrile-butadiene-styrene, polyesters, polyvinylchloride, polyamides, polyurethanes, and homo- and copolymers of propylene, isobutylene, butene, methylpentene, hexene, heptene, octene, isoprene, butadiene, hexadiene, dicyclopentadiene, ethylidene cyclopentene and norbornene, and blends thereof.

8. The composition of claim 6, wherein the amount of said triazine compound is about 0.01 to about 1.0 wt %, the amount of said hindered hydroxbenzoate compound is about 0.1 to about 1.0 wt % and the amount of said hindered amine compound is about 0.1 to about 1.0 wt %, based on the total weight of said material to be stabilized.

9. A process for preparing the composition of claim 6, wherein said material to be stabilized is contacted with said UV stabilizing composition.

10. The process of claim 9, wherein said material to be stabilized is selected from the group consisting of thermoplastic olefins, acrylonitrile-butadiene-styrene, polyesters, polyvinylchloride, polyamides, polyurethanes, and homo- and copolymers of propylene, isobutylene, butene, methylpentene, hexene, heptene, octene, isoprene, butadiene, hexadiene, dicyclopentadiene, ethylidene cyclopentene and norbornene, and blends thereof.

* * * * *

UNITED STATES PATENT AND TRADEMARK OFFICE
CERTIFICATE OF CORRECTION

PATENT NO.    : 6,843,939 B2
DATED         : January 18, 2005
INVENTOR(S)   : Joseph A. Stretanski and Brent M. Sanders It is certified that error appears in the above-identified patent and that said Letters Patent is hereby corrected as shown below:

Column 14,
Line 27, replace "$C_8$" with -- $C_6$ --.

Column 15,
Line 36, replace "bis" with -- tris --.

Column 16,
Line 36, replace "trazaspiro" with -- triazaspiro --.

Signed and Sealed this

Twenty-third Day of August, 2005

JON W. DUDAS
*Director of the United States Patent and Trademark Office*